Aug. 24, 1965        F. G. HARRINGTON        3,201,926
AIR FILTERING BLANKET FOR AN AIR FILTERING SYSTEM
Filed July 12, 1962
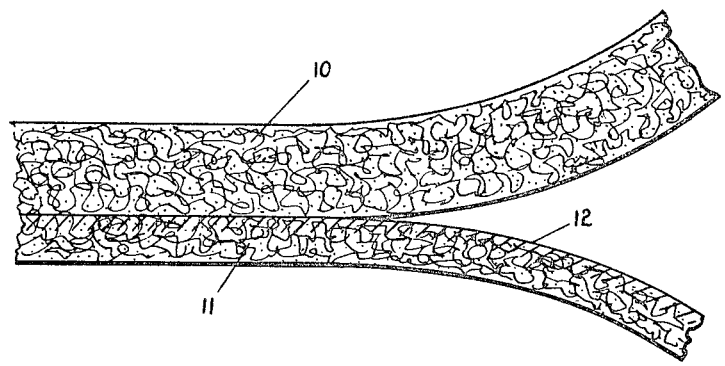
INVENTOR
FREDERICK GEORGE HARRINGTON

3,201,926
AIR FILTERING BLANKET FOR AN AIR FILTERING SYSTEM
Frederick G. Harrington, Toronto, Ontario, Canada, assignor to Industrial Air Filters, Limited, a corporation of Ontario
Filed July 12, 1962, Ser. No. 210,877
2 Claims. (Cl. 55—486)

The present application is a continuation-in-part of my application for United States Letters Patent, Serial No. 168,766, filed January 25, 1962 and now abandoned.

This invention relates to media for air filtering and in particular to a fibrous air filtering blanket comprising an upstream layer of non-tacky fibers and a downstream layer of fibers coated with a normally tacky substance which captures and retains air borne particles.

The present media for air filtering comprises a substantially thick blanket made from fibers coated with a material adapted to capture air borne particles as the air passes through the filter travelling downstream. The fibers may be synthetic or natural, or a mixture thereof.

One type of such filter has the fibers coated with oil. A disadvantage of such types of filter is the migration of oil vapor into the filtered air stream. This oil vapor contaminates the filtered air and somewhat defeats the function of the filter. Some of the migrated oil vapor adheres to the duck system, to ceilings, etc.

Another type of filter for removing air borne particles from the air is by means of electrostatic air filters. The disadvantage of such air filters is that, at high air velocities, the filter will not hold the particles. The unretained particles will thus be carried downstream in the filtered air.

Still another type of filter is made of glass fibers coated with an oil adhesive but the disadvantage of such types of filters is oil migration and the high velocity air causes particles of the glass fibers to break away and be carried downstream in the filtered air.

Still another type of filter is one in which the blanket of fibers is coated on both sides with a dry type (non tacky) adhesive. This type of filter has good filtering characteristics but the full capacity for holding particles is not usable since they tend to surface load (a term known to mean blockage of the surface openings in the filter caused by the build-up of the air borne particles in these openings) and thus shorten the life. A further disadvantage of the dry adhesive type is that as they load up they tend to discharge particles through the filter.

An object of the present invention is to provide a fibrous filter which has the ability to capture and retain more air borne particles, especially particles of a smaller size, than those captured and retained by fibrous air filters presently in use.

A further object of my invention is to provide in a fibrous air filtering blanket, having an upstream non-tacky layer of fibers, and, an upstream filtering layer of fibers coated with a non-migrating, normally tacky substance which increases the efficiency of the filtering.

The term "upstream filtering layer" as used herein means the layer through which the air first flows and "downstream layer" means the layer which is located downstream relative to the "upstream filtering layer."

The fibers of the blanket may be natural, synthetic or a blend of natural and synthetic fibers known to the art for air filtering. Included in the known fibers are glass fibers, natural fibers of animal or vegetable origin such as wool or cotton, and acetate, rayon, nylon, saran, protein fibers etc. of the synthetic kind. Employing standard practices the fibers are usually processed in the form of sheets of the desired dimensions, an air filtering blanket of at least 1″ in thickness being preferred.

In accordance with my invention, a non-migrating, normally tacky substance is applied as a coating to fibers of the blanket to form a filtering layer of coated fibers which serves principally to prevent air-borne particles of a smaller size from passing through the filtering blanket. In order to ensure that the substance is not carried away by the air stream, thereby reducing the effectiveness of the filter, the substance is non-migrating and has negligible vapor pressure. These characteristics of tackiness, non-migrating and negligible vapor pressure, and also in some air conditioning systems, non-inflammability, prevail under air filtering conditions, for example at a temperature in the range of below freezing up to 300° F. Any substance possessing these properties and characteristics may be used to coat the fibers as described hereinafter.

Exemplary of a suitable substance is a polymerized hydrocarbon having negligible water solubility which averts any appreciable removal of the hydrocarbon by water in the air stream. Further examples of suitable substances are as follows:

(1) A polybutene having a molecular weight between 900 and 250,000, preferably between 1000 and 2500. Reference is made to the polybutenes obtained by catalytic polymerization of normal and branched chained butenes and produced by the California Chemical Company under the trade name "Oronite."

(2) A modified resinous material containing a tackifier.

(3) A non-drying or semi-drying vegetable oil, blown or treated to effect polymeriaztion. An example is blown castor oil.

Any apropriate technique may be employed to coat the fibers. For example the normally tacky substance, in the form of a solution or emulsion having a consistency which permits efficacious coating of the fibers without detrimental effect to the pressure drop across the fibrous blanket when used for filtering, may be applied to rolls which press against the fibrous medium. Spraying is also a satisfactory method. Of course the technique employed is adapted to give the desired depth of penetration of the hydrocarbon in the medium.

In the accompanying drawing, one embodiment of the invention, consisting of a fibrous blanket having two layers namely an upstream non-tacky filtering layer and a downstream tacky filtering layer is illustrated. This downstream layer may extend ½ to ¾ of the thickness of the blanket. The upstream filtering layer, consisting of uncoated fibers, will thereby extend through the remaining thickness of the blanket to the upstream surface. In this way a partial filtering of the dust laden air stream is accomplished in the upstream filtering layer while the coated fibers of the downstream filtering layer capture and retain the particles, usually of a smaller size, passing through the upstream filtering layer.

If the filtering layer of coated fibers extends within the blanket from the upstream surface thereof, the medium would have to be replaced very frequently in some air conditioning systems since surface blocking would likely occur owing to the build-up of particles on the upstream surface and in the layer contiguous thereto, of the blanket.

The use of this invention is susceptible to many variations. For instance a single fibrous sheet may be employed as the filtering blanket with at least primary and secondary filtering zones as described previously. In another air conditioning system it may be desirable to have the filtering zone of coated fibers in a single sheet situate downstream from another sheet of uncoated fibers.

A further variation in the use of my invention is illustrated diagrammatically in the accompanying drawing in which the media for air filtering comprises a substantially thick blanket 10 of synthetic fibers in which the interstices may be locked together by a dry (non-tacky) adhesive, a second blanket 11, substantially thinner than the first blanket and which may also have the fibers locked together by a dry adhesive. The two blankets are juxtaposed with the non-drying normally tacky substance penetrating the second blanket from the unexposed face thereof; the substance, in addition to its filtering characteristics, assists the joining and holding together of the two blankets as diagrammatically illustrated in the drawing. A sufficient quantity of the substance is applied to the upstream face 12 to penetrate to a depth of approximately three-quarters of its thickness from the face 12 but insufficient to ooze through to the exposed front face of the blanket 11. In this arangement the uncoated upstream blanket 10 forms the upstream filtering layer, whereas the coated fibers in the downstream blanket 11 extending from the face 12 form the downstream filtering layer. With this arrangement, the media may be more readily handled and stored since the sticky substance is not exposed at either the upstream or downstream surface of the media.

In some applications of the filtering blanket as shown in the drawing, it may be desirable that the first blanket 10 be substantially thick and the second blanket 11 be relatively thin. During manufacture, each blanket has a non-tacky adhesive applied thereto in order to lock the fibers together as is usual in the manufacture of such fibrous sheets. After the application of the non-tacky adhesive, the second blanket 11 has applied thereto a normally tacky substance in a quantity sufficient to penetrate to about three-quarters its depth from the side which will be adhesively attached to the face of the first blanket, care being taken to avoid oozing of the adhesive to the exposed face of the blanket 11. The two blankets are then brought together as previously described with the tacky upstream face of the second blanket 11 adhesively attached to the downstream face of the first blanket.

The filter blanket is then ready for use and when installed in a filtering system, the first blanket 10 is located upstream relative to the blanket 11.

In cases where the normally tacky substance is exposed at the surface of the medium, it may be convenient to cover the surface with any suitable material which facilities handling or storage and which may be easily removed when the medium is to be installed in an air conditioning system.

What I claim as new and desire to protect by Letters Patent of the United States is:

1. In an air filter for an air conditioning system, a substantially non-blocking air filtering fibrous blanket of substantial thickness comprising
 (a) an upstream filtering layer of non-tacky fibers having a thickness of about 50% to 25% of the total thickness of the blanket and presenting to the air travelling therethrough non-tacky surfaces whereby large airborne particles are first removed from the said air and separated from the small airborne particles;
 (b) a downstream filtering layer having the fibers thereof impregnated with a non-migratory, water-insoluble polymerized hydrocarbon selected from the group of polymers consisting of polybutene having a molecular weight between 1000 and 2500, said hydrocarbon characterized by permanent tackiness and negligible vapor pressure, whereby substantially all of the remaining airborne particles are removed from the air.

2. In an air filter for an air conditioning system, a substantially non-blocking air filtering fibrous blanket of substantial thickness comprising:
 (a) an upstream filtering layer of non-tacky fibers having a thickness of about 50% to 25% of the total thickness of the blanket and presenting to the air travelling therethrough non-tacky surfaces whereby large airborne particles are first removed from the said air and separated from the small airborne particles;
 (b) a downstream filtering layer having the fibers thereof impregnated with a non-migratory, water-insoluble polymerized hydrocarbon selected from the group of polymers consisting of polybutene having a molecular weight between 900 and 250,000, said hydrocarbon being characterized by tackiness and negligible vapor pressure at temperatures from below freezing to about 300° F., said downstream filtering layer being from about 50% to about 75% respectively of the total thickness of the primary and secondary zones.

References Cited by the Examiner

UNITED STATES PATENTS

| | | | |
|---|---|---|---|
| 2,019,241 | 10/35 | Weiss | 55—524 |
| 2,061,570 | 11/36 | Frohlich. | |
| 2,078,197 | 4/37 | Hooker et al. | 55—524 |
| 2,579,084 | 12/51 | Trowbridge. | |
| 2,751,040 | 6/56 | Hanley | 55—524 |
| 2,762,775 | 9/56 | Foehr | 55—524 |
| 2,835,341 | 5/58 | Parker | 55—487 |
| 2,888,095 | 5/59 | Perrini et al. | 55—487 |

FOREIGN PATENTS

| | | |
|---|---|---|
| 482,543 | 3/38 | Great Britain. |
| 745,775 | 2/56 | Great Britain. |

HARRY B. THORNTON, *Primary Examiner.*
HERBERT L. MARTIN, *Examiner.*